United States Patent

Engel et al.

(10) Patent No.: US 7,705,882 B2
(45) Date of Patent: Apr. 27, 2010

(54) DEVICE AND SYSTEM FOR ENABLING FAMILIES TO SHARE IN LONG HAUL TRUCKERS' TRAVELS

(75) Inventors: David Engel, Tianjin (CN); Jaewon Kang, Torrance, CA (US); Shamir Karkal, Pittsburgh, PA (US); Timothy C. Simmons, Morrisville, NC (US); Aubrey Shick, Quito (EC)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 418 days.

(21) Appl. No.: 11/760,061

(22) Filed: Jun. 8, 2007

(65) Prior Publication Data

US 2008/0081660 A1 Apr. 3, 2008

Related U.S. Application Data

(60) Provisional application No. 60/804,301, filed on Jun. 9, 2006.

(51) Int. Cl.
*H04N 5/225* (2006.01)
(52) U.S. Cl. .................... 348/207.1; 348/207.99; 348/376; 348/373; D16/218; D16/202
(58) Field of Classification Search .......... 348/207.1, 348/207.99; D26/27, 28, 74; D16/202, 218
See application file for complete search history.

(56) References Cited

U.S. PATENT DOCUMENTS

| | | | | |
|---|---|---|---|---|
| 4,845,803 | A * | 7/1989 | King ........................... | 15/339 |
| 6,349,180 | B1* | 2/2002 | Jabbour et al. .............. | 396/535 |
| 7,272,641 | B2* | 9/2007 | Yamagishi .................. | 709/218 |
| 7,313,405 | B2* | 12/2007 | Tanabe ..................... | 455/456.2 |
| 7,519,292 | B2* | 4/2009 | Takahashi et al. ........... | 396/535 |
| 2002/0154221 | A1* | 10/2002 | Ishimaru .................. | 348/207.1 |
| 2004/0046868 | A1* | 3/2004 | Anderson et al. ...... | 348/207.11 |
| 2004/0078813 | A1* | 4/2004 | Kobuya et al. ................ | 725/46 |
| 2004/0109063 | A1* | 6/2004 | Kusaka et al. ............ | 348/207.1 |
| 2005/0024526 | A1* | 2/2005 | Wang ......................... | 348/373 |
| 2005/0131923 | A1* | 6/2005 | Noguchi et al. ............. | 707/100 |
| 2005/0179799 | A1* | 8/2005 | Umanskiy et al. ....... | 348/333.01 |
| 2007/0200713 | A1* | 8/2007 | Weber et al. ............. | 340/573.1 |

* cited by examiner

*Primary Examiner*—Sinh Tran
*Assistant Examiner*—Christopher K Peterson
(74) *Attorney, Agent, or Firm*—Jeffrey P. Calfa; Mark C. Bach

(57) ABSTRACT

A portable hand-held device (20) has a camera (102) for use by a professional truck driver while on the road to allow pictures taken to be transmitted via a transceiver of the device through a cellular telephone network to an Internet site that is linked with the telephone network and that can be securely accessed via the Internet from a personal computer at the driver's home. Pictures from home can be uploaded to the site and when one is, an alert is issued to the driver. The device also includes a GPS (132) for enabling the site to display travel of the driver on a map.

3 Claims, 7 Drawing Sheets

DEVICE AND SYSTEM FOR ENABLING FAMILIES TO SHARE IN LONG HAUL TRUCKERS' TRAVELS

REFERENCE TO RELATED APPLICATION AND PRIORITY CLAIM

This application claims the priority of Provisional Patent Application No. 60/804,301, filed on 9 Jun. 2006, the entire content of which is incorporated herein by reference.

FIELD OF THE INVENTION

This invention relates to a device and system for enabling families to share in long haul truckers' travels.

BACKGROUND OF THE INVENTION

The United States trucking industry is facing a shortage of long-haul drivers and is seeking to hire large numbers of new, and often younger, truck drivers in the foreseeable future.

A long-haul trucker must spend extended periods of time away from family members, and that fact is a significant impediment to bringing younger drivers into the trucking industry and retaining them.

While wireless media such as a cellular telephone can provide a means of communication while a driver is on the road, such media may not be convenient to use in certain situations due to various distractions such as noise and may not fully satisfy a trucker's need to connect with a home that may be far away. Other wireless media can be complicated to use and even prohibitively expensive for many truckers.

SUMMARY OF THE INVENTION

The inventors believe that the hiring and retention of long-haul truck drivers can be facilitated by enabling truckers to enrich their means of keeping in touch with family while on the road, and vice versa, via an independent non-voice communication link that can be used alone to convey information about a trucker's on-the-road travel or to supplement cellular telephone communication by providing information about the trucker's progress along a travel route images and images correlated related with the trucker's travel route.

The communication link utilized by the invention is part wireless-based and part Internet-based. The wireless component, while not providing voice communication, still uses wireless communication technology that provides for the transmission and reception of certain non-voice data between a small hand-held portable device carried by a driver and a tower of a cellular telephone network in the vicinity of the device.

The Internet-based component comprises an Internet site that is linked to the cellular telephone network in order to receive data from the portable device via a tower of the cellular telephone network that receives the data transmitted by the portable device when the device is within reception range of the tower. The Internet site can also send data to the device by transmission from a tower when the device is within range of the tower. The Internet site can communicate with a personal computer accessible to a driver's family at a convenient location, such as in the home.

The hand-held portable device comprises a small electronic camera for capturing and storing electronic images of pictures taken by the trucker and automatically transmitting them via the cellular network to the Internet site. When the family accesses the Internet site, they can view the pictures. Each picture can also be correlated with the approximate location and time at which it was taken by the inclusion of a GPS sensor in the hand-held device.

The family can upload its own pictures from home to the Internet site. Because its small size and relatively inexpensive cost are important aspects of the hand-held portable device, it presently lacks a monitor or display for viewing pictures from home, but in the future could embody a small display of a size appropriate for its hand-held shape if cost implications of such an added component are favorable. With the present form of the device, the Internet site will transmit an alert to a trucker on the road whenever a picture from home has been uploaded to the site so that with knowledge that a picture has been uploaded, a trucker can view the picture at a time and place when and where Internet access is available to him or her.

One general aspect of the invention relates to a portable hand-held device comprising a walled case comprising a front face and a rear face bounding opposite sides of an interior space that contains a radio transceiver and antenna for transmitting and receiving radio signals containing digital data and an electronic digital camera that has an aperture looking through a window in a portion of the wall of the case for acquiring an electronic image of a field of view. The sight extends through the case between the front and rear faces for enabling a user to see a field of view corresponding to the field of view seen by the camera aperture. A trigger operates the camera and is operable by an index finger of the user's hand when holding the case between the front and rear faces with the thumb of the hand against one face and one or more fingers beyond the index finger against the other face.

More specific aspects relate to details of the device.

Another general aspect of the invention relates to a system for non-voice communication between a person and the person's home that comprises a wireless-based portion and an Internet-based portion. The wireless-based portion provides for the radio transmission and reception of certain non-voice data between a small hand-held portable device carried by the person and a tower of a cellular telephone network in the vicinity of the device. The Internet-based portion comprises an Internet site that is linked via the Internet and the cellular telephone network to the device, and a personal computer that is linked via the Internet to the Internet site.

More specific aspects relate to details of the system.

The foregoing, along with further features of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
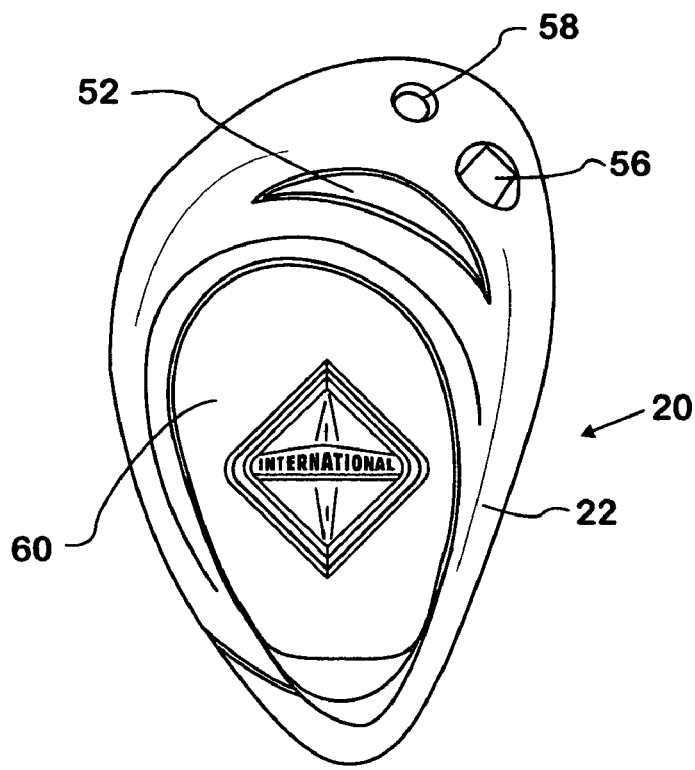
FIG. 1 is a front plan view of a portable hand-held device that embodies principles of the present invention.
Figure 2:
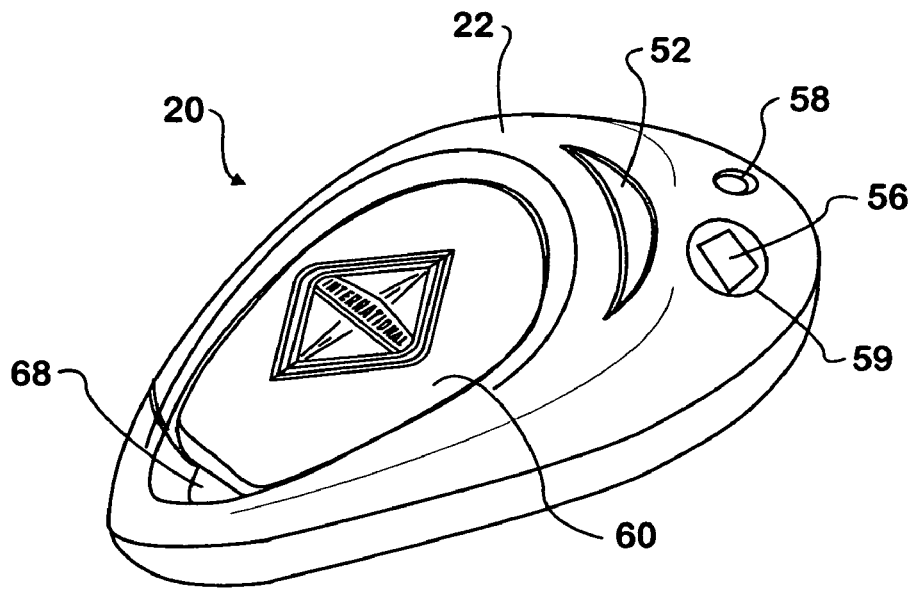
FIG. 2 is a perspective view of the front face of the device of FIG. 1 looking at an inclined angle from the lower right.
Figure 3:
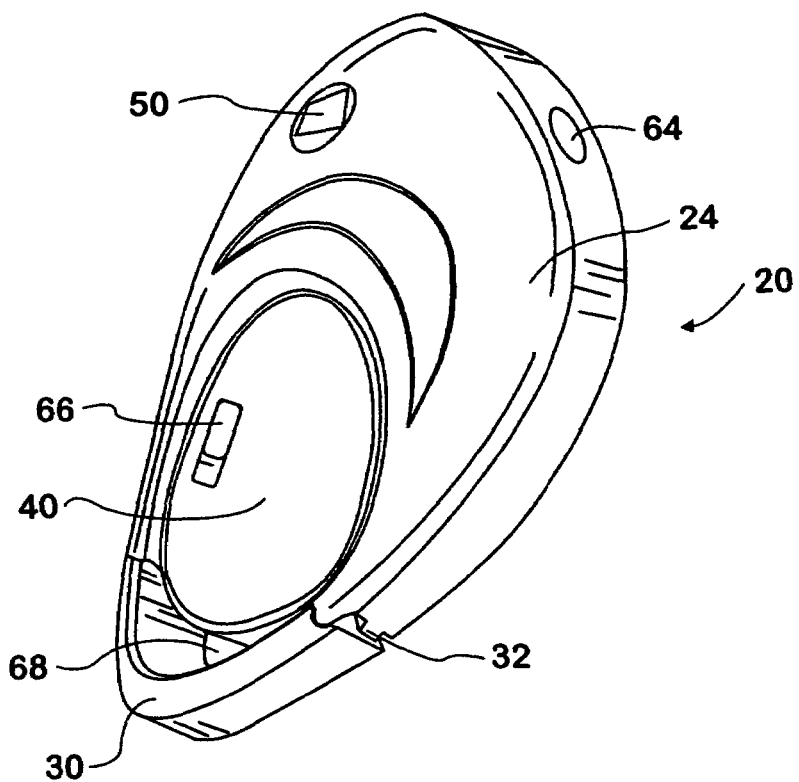
FIG. 3 is a perspective view of the rear face of the device of FIG. 1 looking at an inclined angle from the lower left.

For illustrating principles of the invention, the drawings shows a portable hand-held device 20 to comprise front and rear halves 22, 24 of a casing that fit together to enclose an interior space. Rear half comprises 24 comprises a relatively thin rear face 26, and front half 22 is itself relatively thin. A perimeter wall 28, shown as part of rear half 24, is disposed between the front and rear faces and bounds the interior space.

A curved clip 30 is hinged on the case by a protrusion 32 of wall 28 fitting into a throat 34 at one end of the clip and a hinge pin 36 that passes through aligned holes in the protrusion and clip. The clip can be opened from the closed position shown in FIGS. 1-4 and then re-closed to allow the portable hand-held device to be clipped onto and off of a belt, belt loop, or fob ring that will pass through an open space 68. Any suitable releasable mechanism, such as magnets 38, can be used to keep the clip closed but allow the clip to be opened.

The casing is fabricated from a smooth hard plastic to provide a grip zone in rear face in rear face 24 that is occupied by a softer, high friction material 40 to resist slippage when the casing is being grasped by a user. A slot 42 is present in the material 40 for a purpose that will be described in more detail later.

A crescent shaped lens 44 is fit to a similarly shaped through-opening 46 in rear face 24. A notch 48 is present in the edge of perimeter wall 28, and a through-hole 50 of rectangular cross section extends through both wall 28 and rear face 26, as shown.

Another crescent shaped lens 52 is fit to a similarly shaped through-opening 54 in front face 22. A through-hole 56 of rectangular cross section extends through front face 22, and a transparent cover window 58 is fit to an adjacent through-hole, both the through-hole 56 and the cover 58 being disposed beyond through-opening 54 relative to a grip zone in front face 22 that is occupied by a softer, high friction material 60, shown to contain a company logo, for resisting slippage when the casing is being grasped by a user.

When the two casing halves are fit together, through-hole 56 aligns with through-hole 50 to form an eye-hole through which a user can view, and use its rectangular cross section to frame, a scene. Opposite ends of the eye-hole are closed by circular transparent windows 59, 61 recessed into the surface of the case. A pushbutton 64 is fit to the opening through perimeter wall 28 created by notch 48 and the overlying portion of front face 22.

Figure 6:
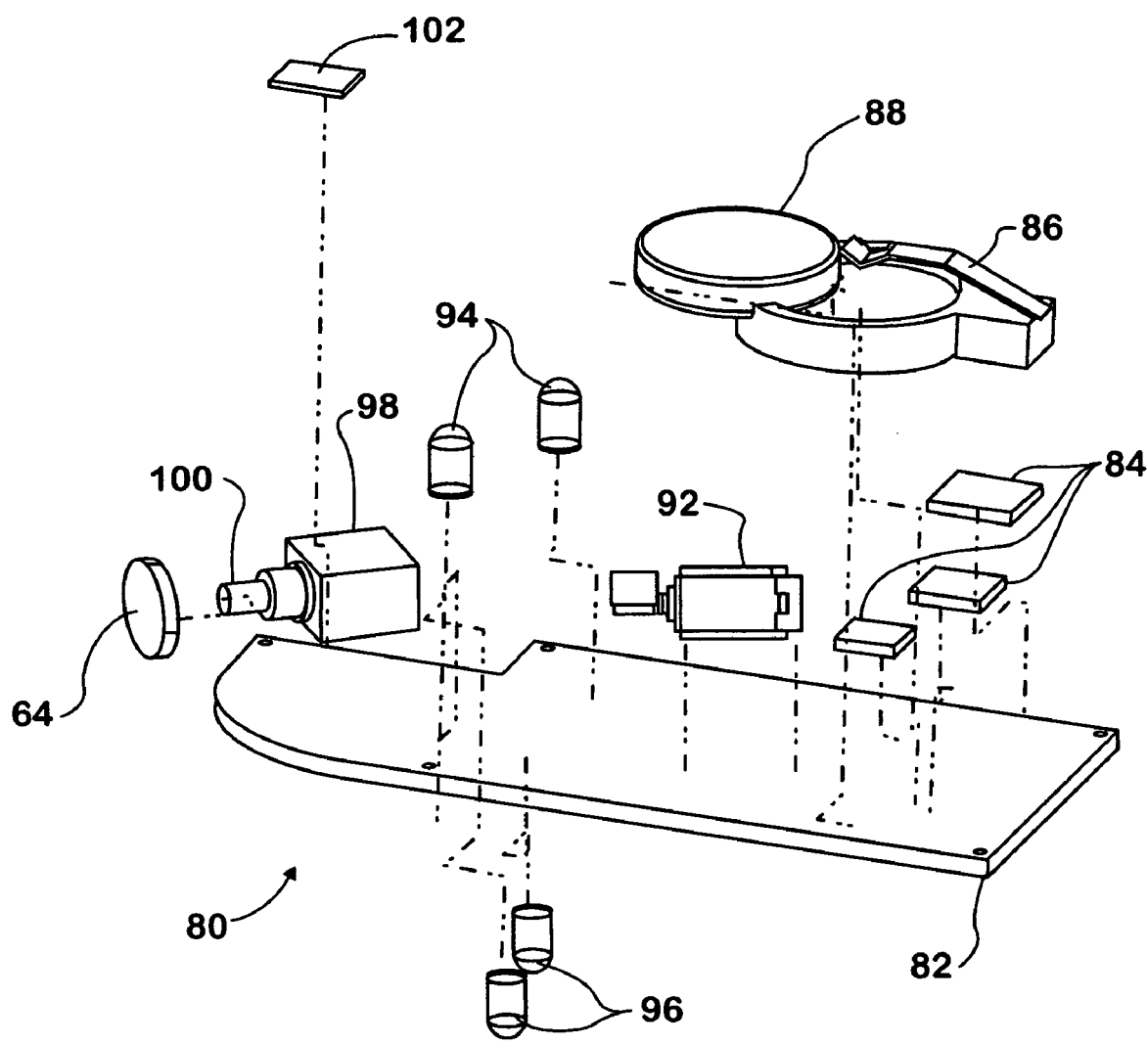
FIG. 6 is an exploded perspective view of components inside the case.

Internal components of device 20 are shown in FIG. 6, not necessarily to scale. They include a circuit board assembly 80 that comprises a circuit board 82 on which are mounted several electronic components, collectively represented by the reference numeral 84, a battery receptacle 86 for holding a battery 88 that powers the device, a vibrator 92, a pair of LED's 94, another pair of LED's 96, and a switch 98 having a plunger 100. A small electronic digital camera 102 is disposed in association with switch 98.

Figure 5:
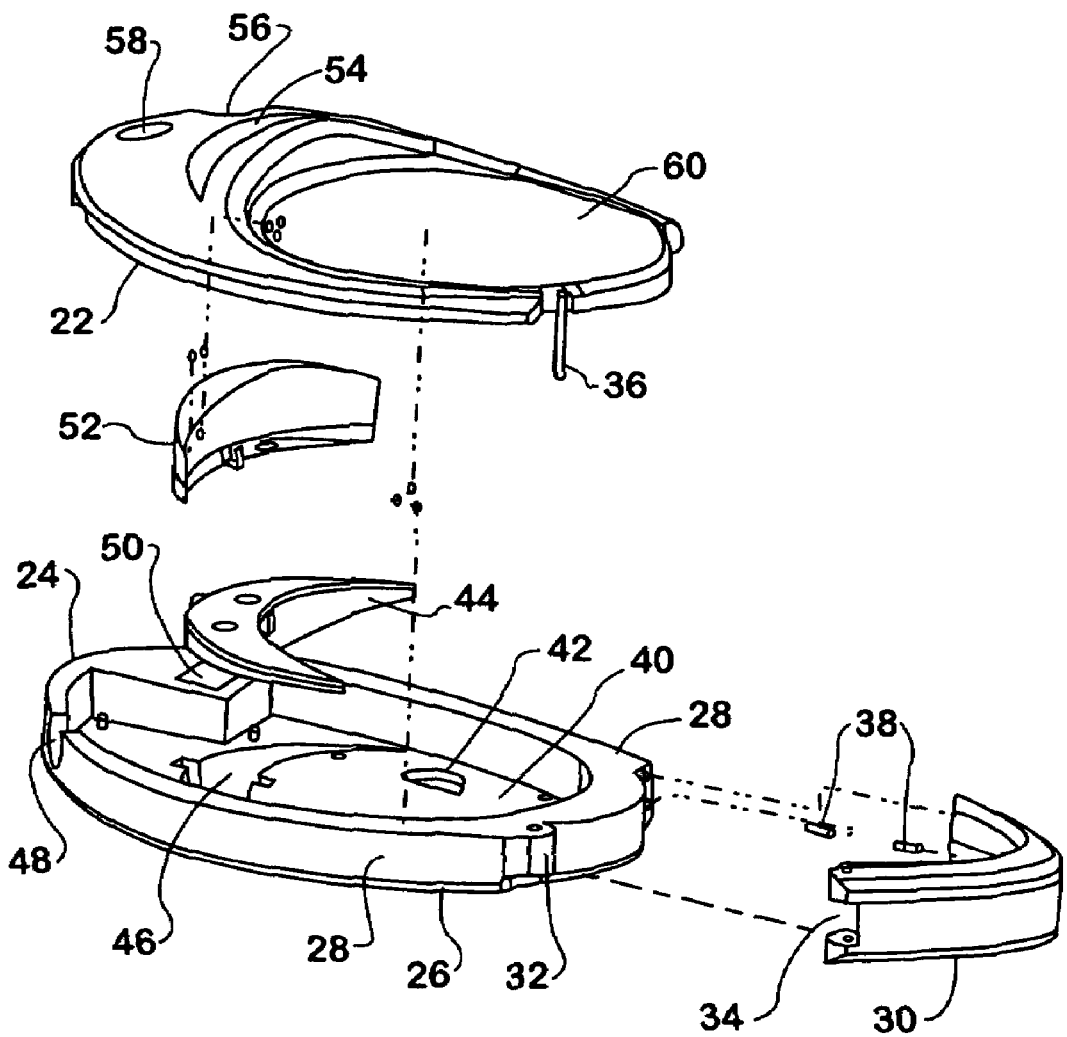
FIG. 5 is an exploded perspective view of components of the case of the device.

As can be appreciated from the views of FIGS. 5 and 6, which incidentally are not to the same scale, circuit board assembly 80 fits closely within the interior space bounded by perimeter wall 28. When assembly 80 is so placed, plunger 100 aligns with pushbutton 64, and the aperture of camera 102 aligns with the through-hole containing transparent window 58.

Figure 9:
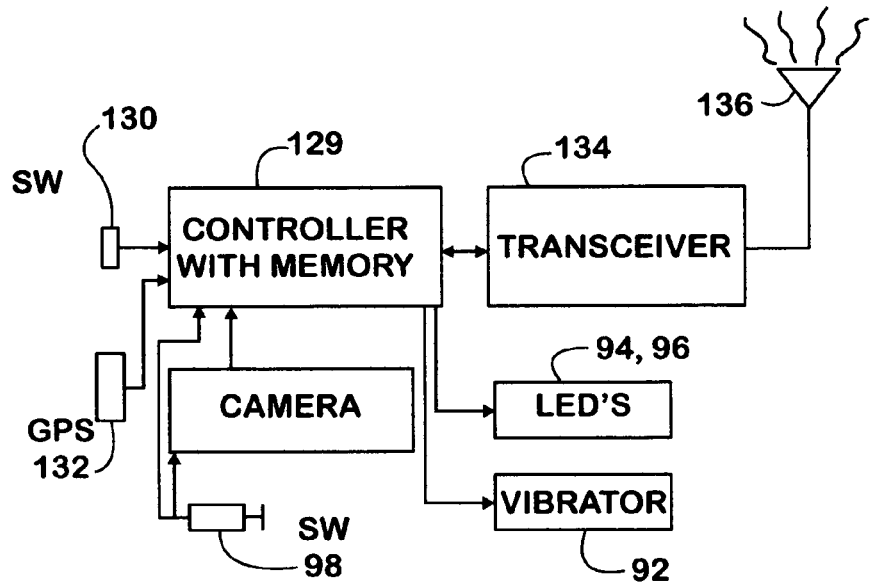
FIG. 9 is a general schematic diagram associating components inside the case.

The actuator 66 (FIG. 4) of a slide switch 130 in FIG. 9 (not seen in FIG. 6 because it is mounted on the rear face of circuit board 82) fits to slot 42 so as to be essentially flush with the outer surface of the grip material. Actuator 66 is a transparent "fish-eye" lens that allows the switch position to be viewed by enlarging indicia showing the position below the fish-eye. Although substantially flush in order to avoid accidental re-positioning, the actuator can be slid because the surrounding material 40, such as a rubberized plastic, has some resilient give.

With assembly 80 in place inside the casing, LED's 94 underlie lens 52, and LED's 96 are behind lens 44.

FIG. 9 shows how the various internal components are related. The electronic components collectively represented by the reference numeral 84 include a controller 129 having digital memory for storing electronic images captured by camera 102. A transceiver 134 and antenna 136 provide wireless radio communication of data between device 20 and a tower of a cellular telephone network when the device is within range of the tower. The switch plunger 100, when depressed by pushbutton 64, can be used not only trigger the camera to capture an image, but also can be used as an input to the controller for a second purpose to be described later. Switch 130 is another input to the controller. An additional component on the circuit board is a global position sensor (GPS) 132, although a less costly alternative to a GPS would be to triangulate the position of the device by process data representing the incoming directions of radio signals from two nearby telephone towers of the cellular network and the geographical locations of those towers.

The controller operates to transmit stored image and global position data via the transceiver to a network tower. When data is transmitted from a nearby tower to device 20, it is processed by the controller to give an alert by operating either vibrator 92 alone, or both vibrator 92 and LED's 94, 96.

The particular one of the two alert modes desired is set by switch 130. That switch can also be operated to a third position that can turn the device off by removing battery power from the controller and transceiver.

Besides operating camera 102 to capture an image, switch 100 can be used to shut off an on-going alert, thereby avoiding the need for an additional switch. This can be accomplished because the camera requires that the trigger be depressed for some particular length of time in order to capture an image of the field of view. When the trigger is depressed for a length of time less than that required to operate the camera and then released, the controller that caused the alert to be given when an alert was received by device 20 shuts off the device that is giving the alert.

Figure 4:
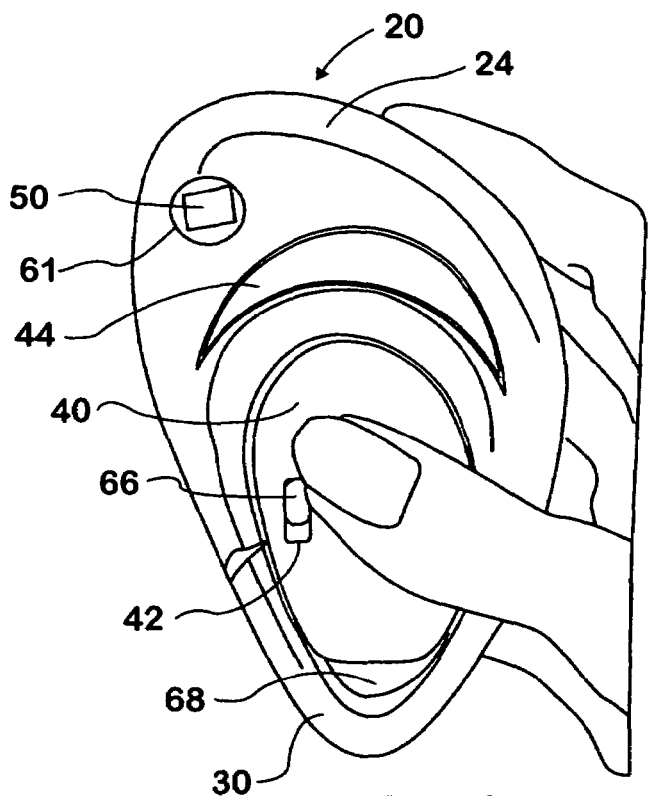
FIG. 4 is a rear plan view of the portable hand-held device being gripped by a person's right hand to take a picture.

FIG. 4 shows how device 20 can be used to take a picture. The user holds the case between the front and rear faces with the thumb of the right hand against the material 42 on the back face of the case and one or more fingers beyond the index finger against the material 60 on the front face. The user then places one eye at window 61 to look through the eye-hole and see the field of view also seen by the camera. When the desired view is in sight, the tip of the index finger conveniently resting on the convexly curved portion of perimeter wall 28 adjacent pushbutton 64 depresses and holds the pushbutton long enough for the picture to be taken.

The drawings show that this convexly curved portion of the perimeter wall that includes pushbutton 64 forms an apex disposed to one lateral side of an imaginary medial plane through the case as the case is viewed looking toward either face. Also the sight and the window 58 for the camera aperture are disposed to opposite sides of an imaginary line that is perpendicular to a tangent to the apex.

Device 20 is part of a wireless component of a home-trucker non-voice data communication system that also has an Internet-based component. The Internet-based component comprises an Internet site that is linked to a cellular telephone network having a network of towers that can transmit data to and receive data from device 20. The Internet site can communicate with a personal computer accessible to a trucker's family at a convenient location, such as in the home.

Figure 7:
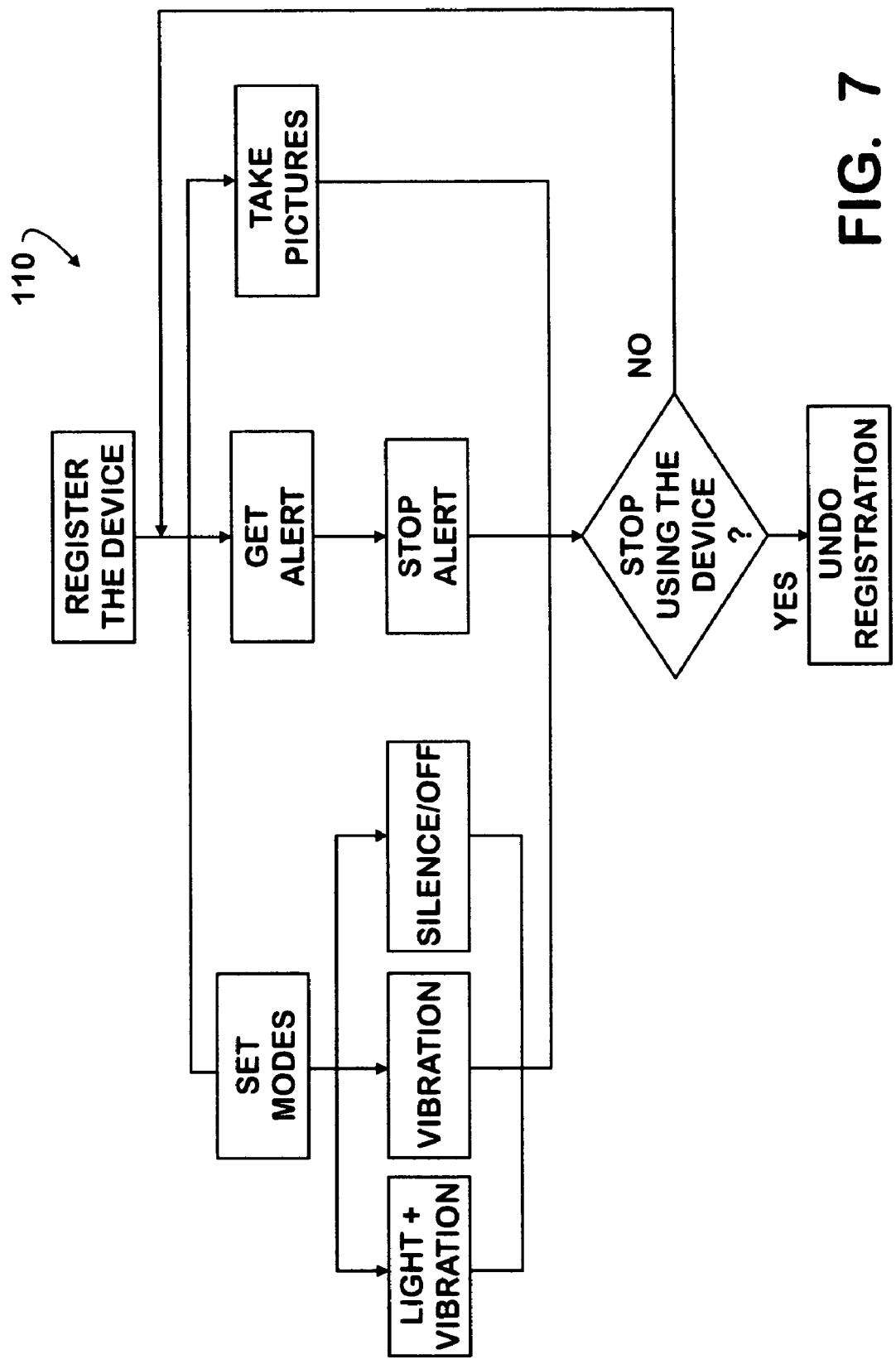
FIG. 7 is a diagram illustrating a protocol for use of the device in conjunction with an Internet-based component of a system embodying further principles of the invention.
Figure 8:
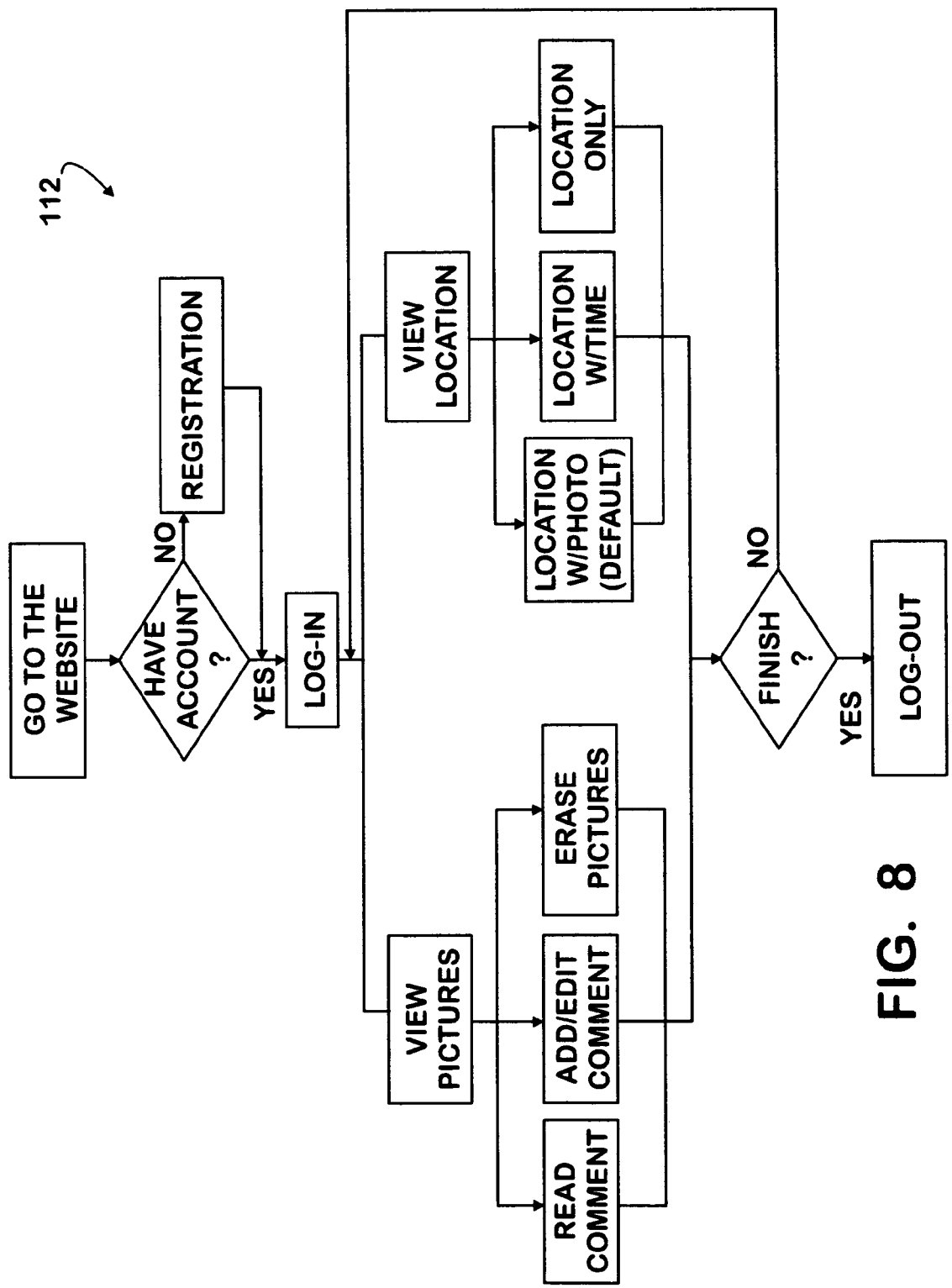
FIG. 8 is another diagram illustrating a protocol for use of the Internet-based component.

FIGS. 7 and 8 show respective protocols 110, 112 for device 20 and the Internet site respectively. Camera 100 captures and stores electronic images of pictures taken by the trucker and automatically transmits them via the cellular network to the Internet site when device 20 is "on". When the family accesses the Internet site, they can view the pictures. Each picture can also be correlated with the approximate time and location at which it was taken by data from GPS 132 and a clock.

A trucker's progress along a route of travel can be identified by on-going periodic transmissions of GPS data to the Internet site. That data is then superimposed on an appropriate electronic map stored at the Internet site which is accessible by the family's home personal computer.

Figure 10:
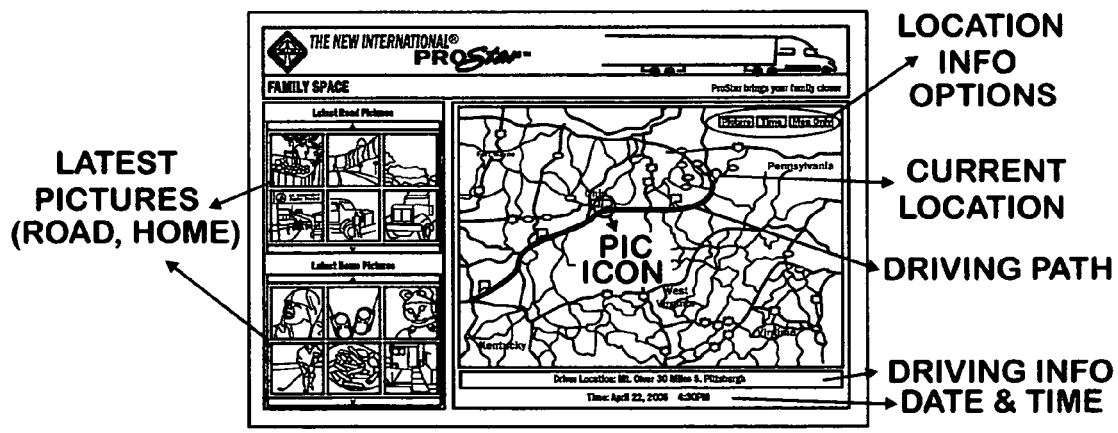
FIG. 10 is a display provided on a personal computer monitor by the system.

FIG. 10 shows a representative display screen that the family can view on a monitor associated with the personal computer. The larger area on the right shows a map containing a trace of the trucker's route of travel. The two smaller areas to the left contain small images transmitted from device 20 and from home respectively.

The family can upload its own pictures from home to the Internet site. Because its small size and relatively inexpensive cost are important aspects of the hand-held portable device, as discussed earlier, it presently lacks a monitor or display for viewing pictures from home. However, the Internet site will transmit the alert to a trucker on the road whenever a picture from home has been uploaded to the site so that the trucker can view the picture at a time and place when and where Internet access is available to him or her.

While a presently preferred embodiment of the invention has been illustrated and described, it should be appreciated that principles of the invention apply to all embodiments falling within the scope of the invention that is defined as follows.

What is claimed is:

1. A portable hand-held device comprising:
a walled case comprising a front face and a rear face bounding opposite sides of an interior space that contains a radio transceiver and antenna for transmitting and receiving radio signals containing digital data and an electronic digital camera that has an aperture looking through a window in a portion of the wall of the case for acquiring an electronic image of a field of view;
a sight extending through the case between the front and rear faces for enabling a user to see a field of view corresponding to the field of view seen by the camera aperture;
a trigger for operating the camera and that is operable by an index finger of the user's hand when holding the case between the front and rear faces with the thumb of the hand against one face and one or more fingers beyond the index finger against the other face;
wherein the trigger is disposed in a portion of a perimeter wall of the case bounding and between the front and rear faces, the portion of the perimeter wall having a convex shape as the case is viewed looking toward either face, wherein the portion of the perimeter wall having a convex shape extends beyond the trigger to form an apex disposed to one lateral side of an imaginary medial plane through the case as the case is viewed looking toward either face, and the sight and the window for the camera aperture are disposed to opposite sides of an imaginary line that is perpendicular to a tangent to the apex, wherein the casing comprises a smooth hard plastic having thumb- and finger-grip zones in the front and rear faces that are filled by a softer, high friction material to resist thumb- and finger-slipping when the casing is being grasped;
one or more devices within the interior space for issuing an alert when data is received by the transceiver;
a slider switch having an actuator that is disposed substantially flush with the outer surface of the material filling one of the grip zones and that can be slid along the through-slot to set a particular one of multiple modes for giving the alert;
wherein the one or more alert devices comprise a vibrator and one or more lamps, and the slider switch can select between a vibrate only mode, and light and vibrate mode, and an off mode, wherein the case comprises crescent shaped lenses that are disposed in like shaped through-openings in the front and rear faces and that lie between the grip zones and the sight, wherein the camera requires that the trigger be depressed for some particular length of time in order to capture an image of the field of view, and a controller within the interior space that operates the one or more alarm devices is connected to the trigger for interrupting an on-going alert when the trigger is depressed for a length of time less than that required to operate the camera.

2. A portable hand-held device as set forth in claim 1 further including a curved clip that is hinged on the case generally opposite the apex and that can be opened and closed to allow the portable hand-held device to be clipped onto and off of a belt or fob ring.

3. A portable hand-held as set forth in claim 1 further including a GPS sensor whose data is periodically transmitted by the transceiver.

* * * * *